(12) United States Patent
Heo et al.

(10) Patent No.: US 11,575,907 B2
(45) Date of Patent: *Feb. 7, 2023

(54) METHOD FOR PROCESSING IMAGE ON BASIS OF INTRA PREDICTION MODE AND APPARATUS THEREFOR

(71) Applicant: LG ELECTRONICS INC., Seoul (KR)

(72) Inventors: Jin Heo, Seoul (KR); Yongjoon Jeon, Seoul (KR); Sunmi Yoo, Seoul (KR); Eunyong Son, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 165 days.

This patent is subject to a terminal disclaimer.

(21) Appl. No.: 17/100,011

(22) Filed: Nov. 20, 2020

(65) Prior Publication Data

US 2021/0112255 A1   Apr. 15, 2021

Related U.S. Application Data

(63) Continuation of application No. 16/677,100, filed on Nov. 7, 2019, now Pat. No. 10,880,553, which is a
(Continued)

(51) Int. Cl.
*H04N 19/159* (2014.01)
*H04N 19/176* (2014.01)
(Continued)

(52) U.S. Cl.
CPC ......... *H04N 19/159* (2014.11); *H04N 19/107* (2014.11); *H04N 19/119* (2014.11); *H04N 19/176* (2014.11); *H04N 19/593* (2014.11)

(58) Field of Classification Search
CPC .. H04N 19/159; H04N 19/107; H04N 19/119; H04N 19/176; H04N 19/593
See application file for complete search history.

(56) References Cited

U.S. PATENT DOCUMENTS

2011/0158315 A1\* 6/2011 Kim ..................... H04N 19/503
375/240.03
2011/0116607 A1  7/2011 Kim et al.
(Continued)

FOREIGN PATENT DOCUMENTS

JP    2006-005438 A    1/2006
KR    10-2011-0001885 A    5/2010
(Continued)

OTHER PUBLICATIONS

J. Lainema et al., "Intra Coding of the HEVC Standard", IEEE Transactions on Circuits and Systems for Video Technology, vol. 32, No. 12, Dec. 1, 2012, pp. 1792-1801, XP055559664.
(Continued)

*Primary Examiner* — Kevin Ky
(74) *Attorney, Agent, or Firm* — Dentons US LLP

(57) ABSTRACT

In the present invention, a method for processing an image on the basis of an intra prediction mode and an apparatus therefor are disclosed. Particularly, the method for processing an image on the basis of an intra prediction mode may comprise the steps of: partitioning a block to be processed, on the basis of an intra prediction mode of the block to be processed; and performing intra prediction for the split block to be processed, wherein the direction in which the block to be processed is split is perpendicular to the prediction direction of the intra prediction mode of the block to be processed.

10 Claims, 20 Drawing Sheets

Related U.S. Application Data continuation of application No. 15/560,651, filed as application No. PCT/KR2015/013170 on Dec. 3, 2015, now Pat. No. 10,506,238.

(60) Provisional application No. 62/137,163, filed on Mar. 23, 2015.

(51) Int. Cl.
  *H04N 19/107* (2014.01)
  *H04N 19/119* (2014.01)
  *H04N 19/593* (2014.01)

(56) References Cited

U.S. PATENT DOCUMENTS

| | | | | |
|---|---|---|---|---|
| 2011/0176607 | A1* | 7/2011 | Kim | H04N 19/593 375/E7.243 |
| 2012/0082222 | A1* | 4/2012 | Wang | H04N 19/176 375/E7.243 |
| 2013/0294525 | A1* | 11/2013 | Norkin | H04N 19/176 375/240.24 |
| 2014/0355679 | A1* | 12/2014 | Rosewarne | H04N 19/70 375/240.12 |
| 2014/0355687 | A1* | 12/2014 | Takehara | H04N 19/513 375/240.16 |
| 2015/0049818 | A1* | 2/2015 | Yie | H04N 19/44 375/240.16 |
| 2018/0098074 | A1* | 4/2018 | Heo | H04N 19/159 |
| 2021/0112255 | A1* | 4/2021 | Heo | H04N 19/119 |

FOREIGN PATENT DOCUMENTS

| | | |
|---|---|---|
| KR | 10-2010-0112247 A | 10/2010 |
| KR | 10-2011-0003414 A | 1/2011 |
| KR | 10-2011-0019855 A | 3/2011 |
| WO | 10/002214 A2 | 1/2010 |
| WO | 2013-058520 A1 | 4/2013 |

OTHER PUBLICATIONS

J. Xu, et al., "Improvements for SDIP," Joint Collaborative Team on Video Coding (JCT-VC) of ITU-T SG16 WP3 and ISO/IEC JTC1/SC29/WG11, Nov. 21-30, 2011, JCTVC-G354.

* cited by examiner

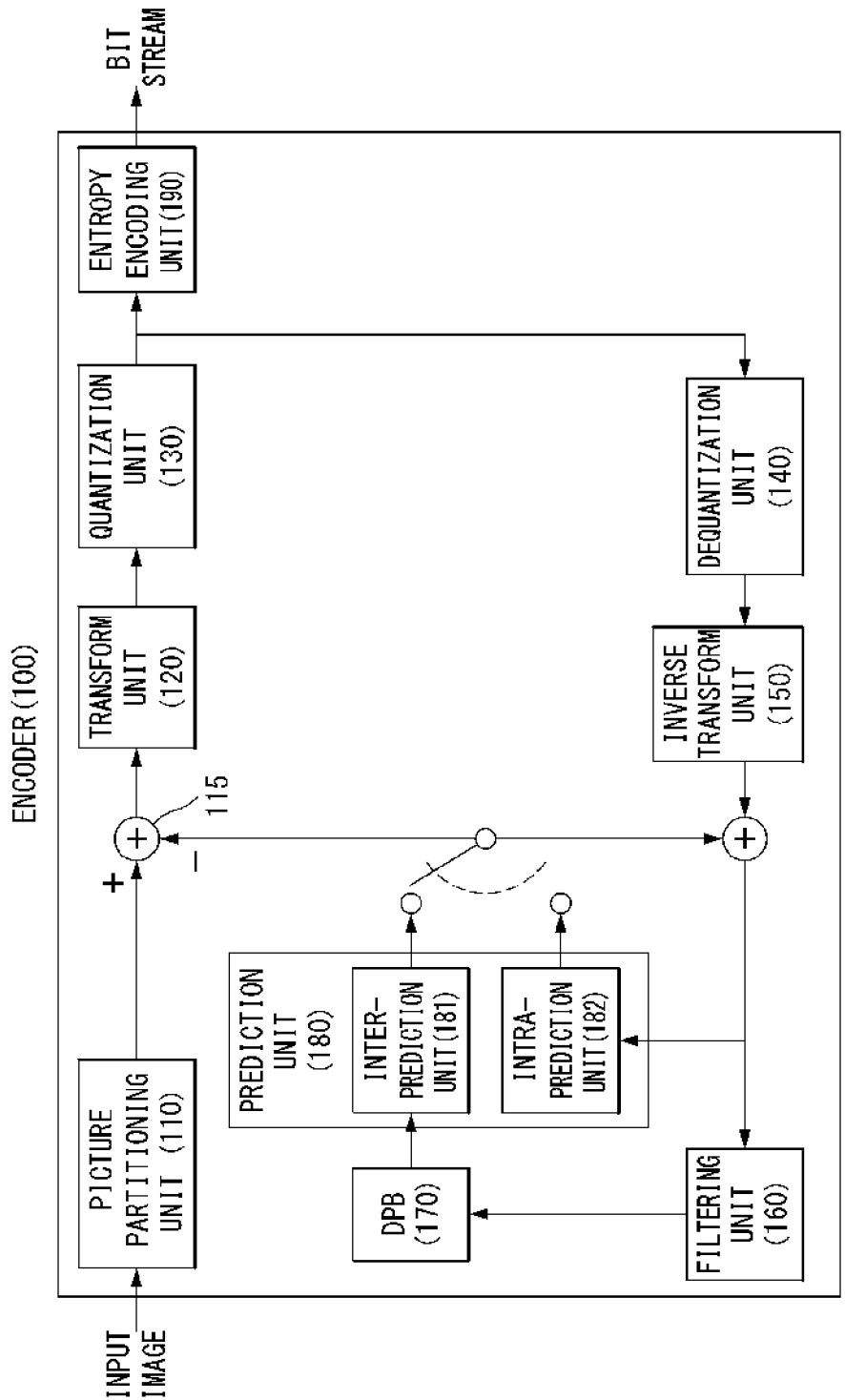
[Fig. 1]

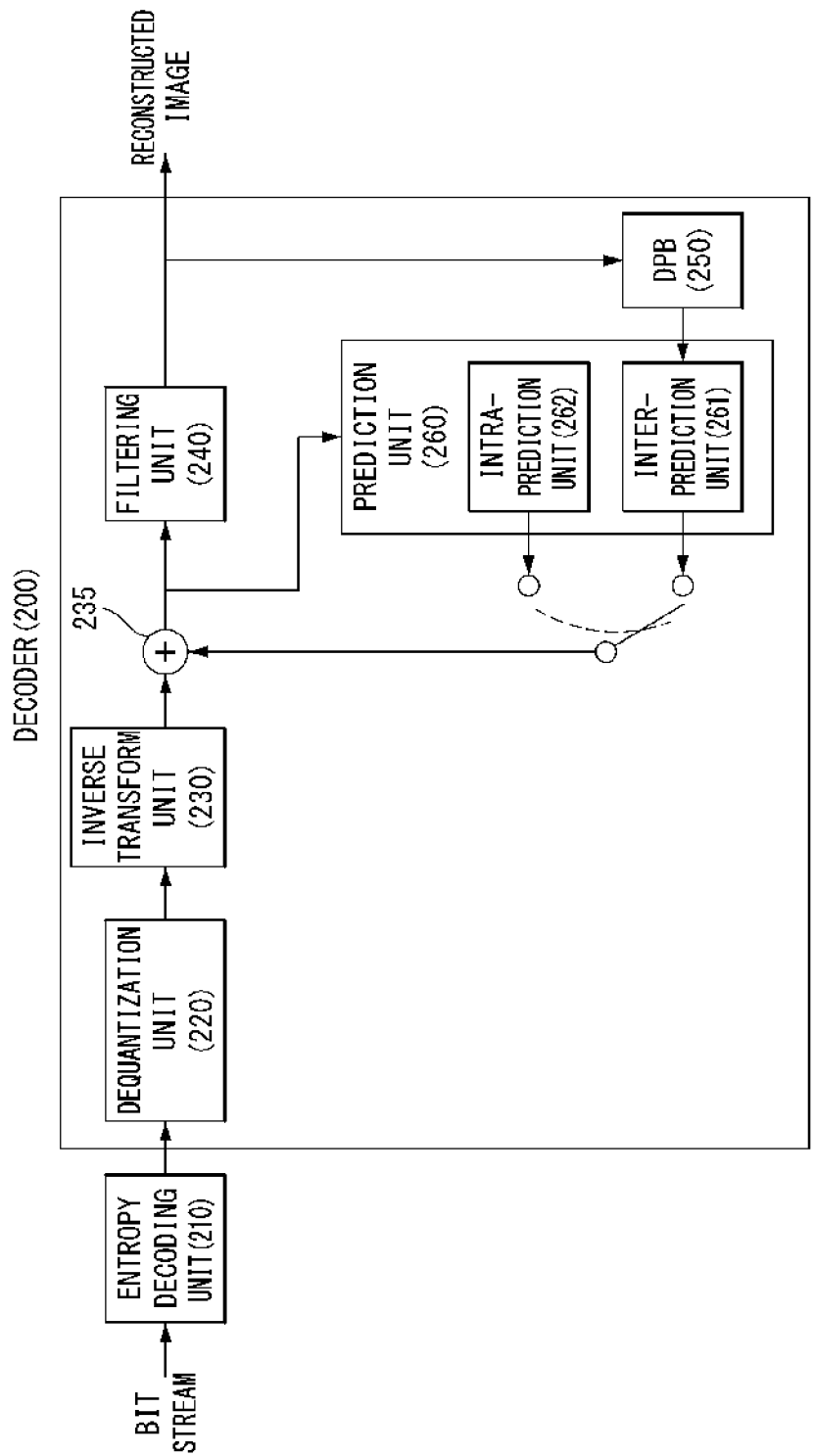
[Fig. 2]

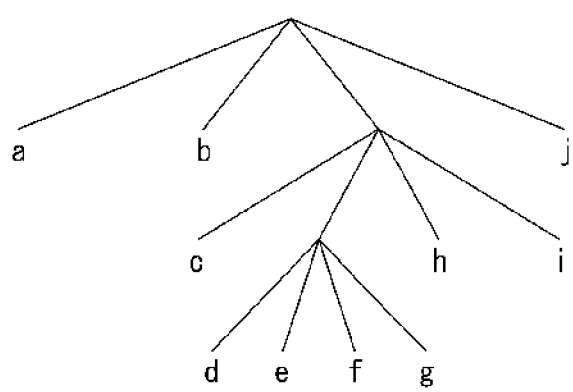
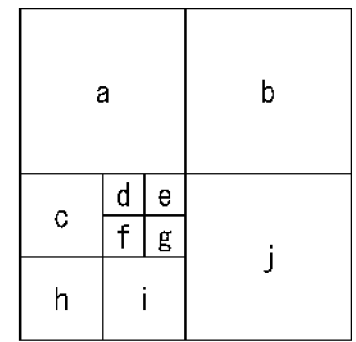
[Fig. 3A]                [Fig. 3B]

[Fig. 4]
Intra:
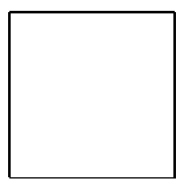
2Nx2N
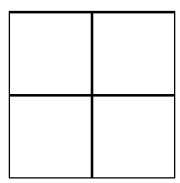
NxN
Inter:
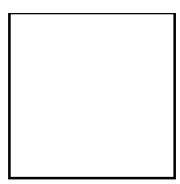
2Nx2N
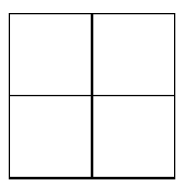
NxN
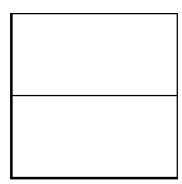
2NxN
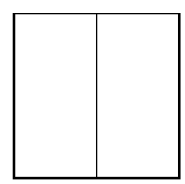
Nx2N
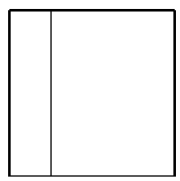
nLx2N
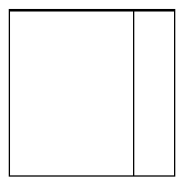
nRx2N
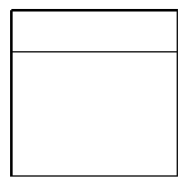
2NxnU
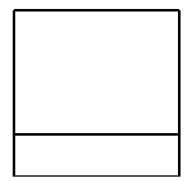
2NxnD

[Fig. 5]
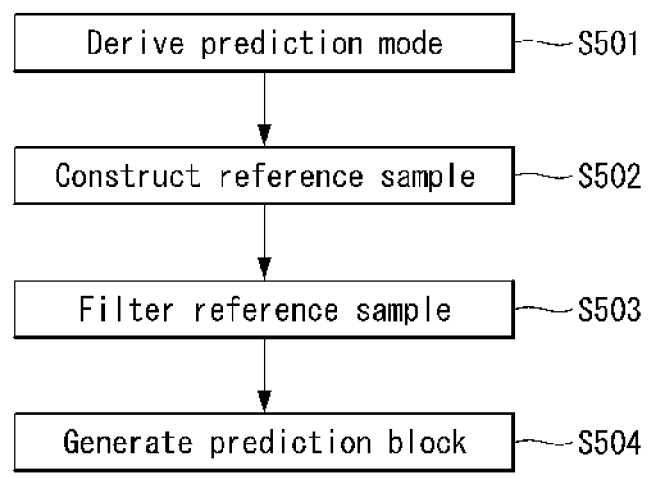

[Fig. 6]
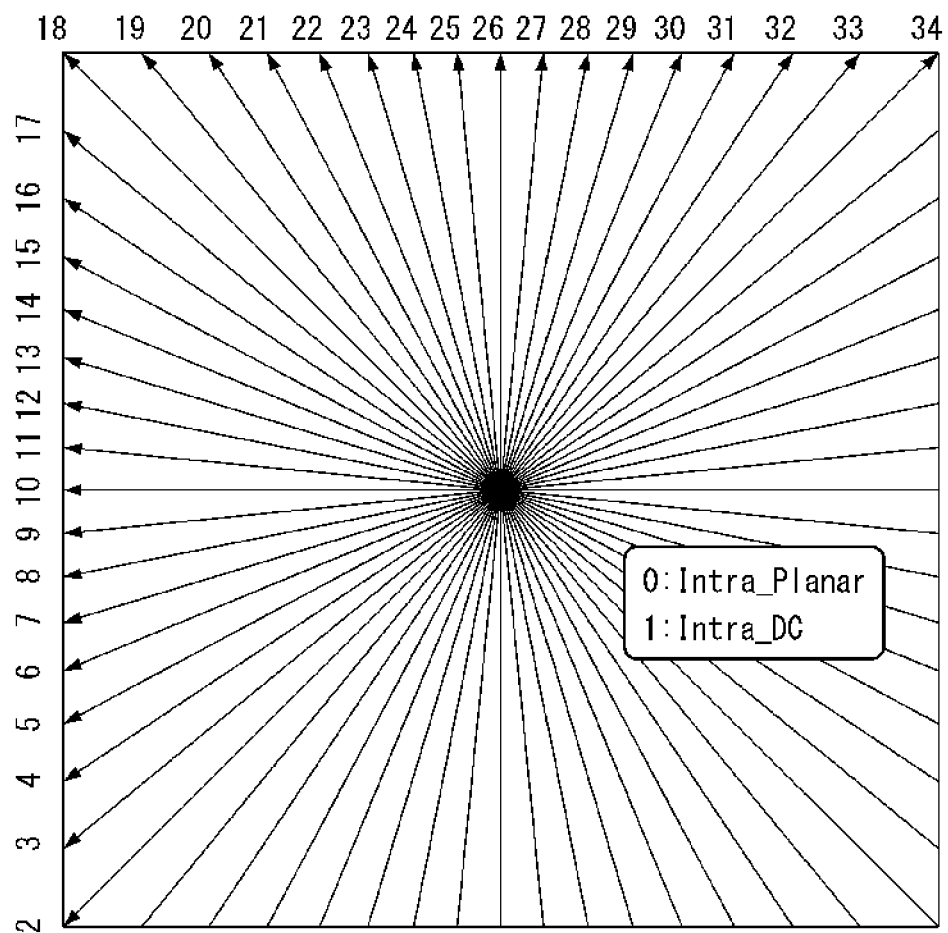

[Fig. 7]
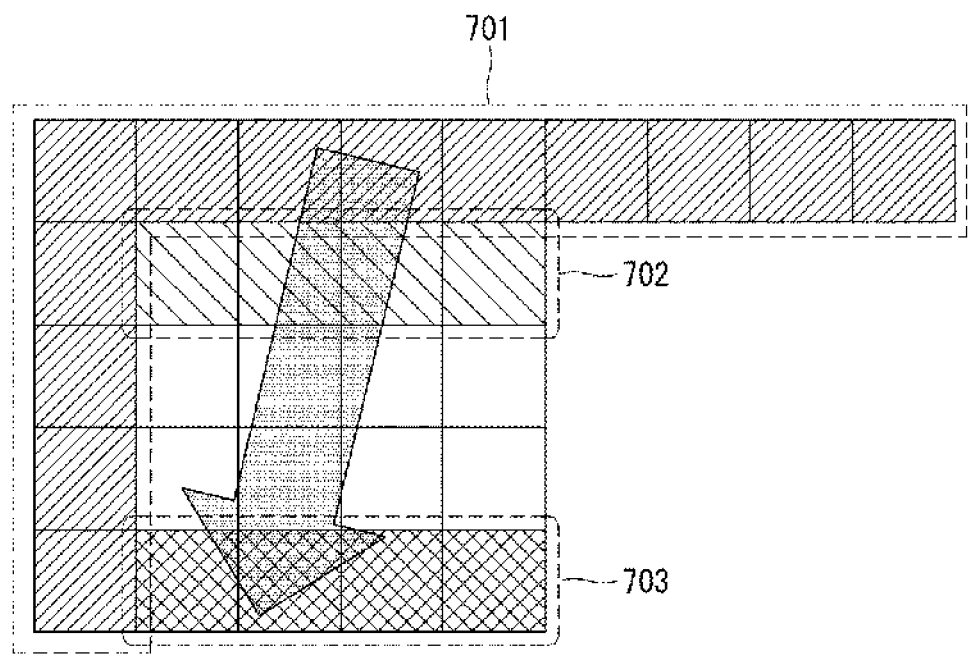

[Fig. 8]
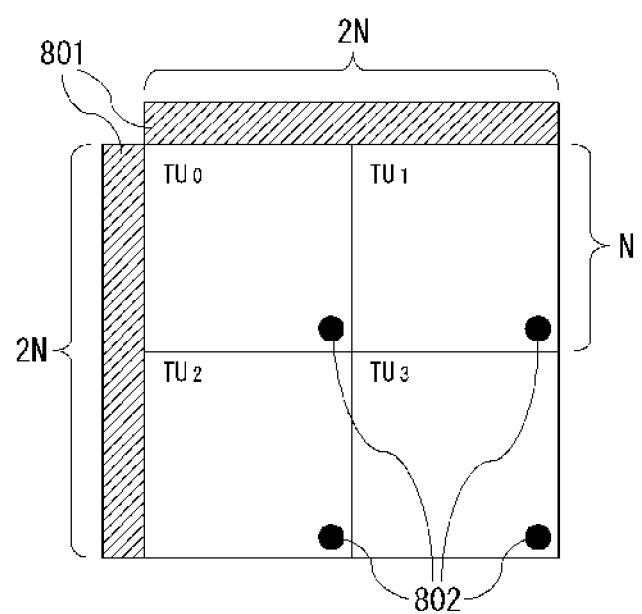

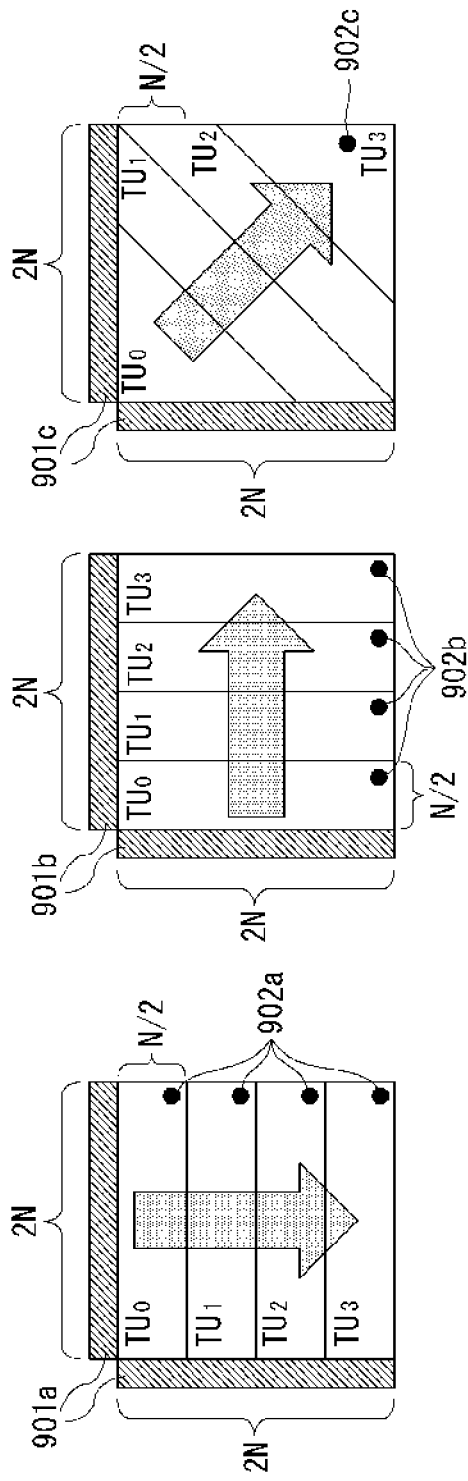

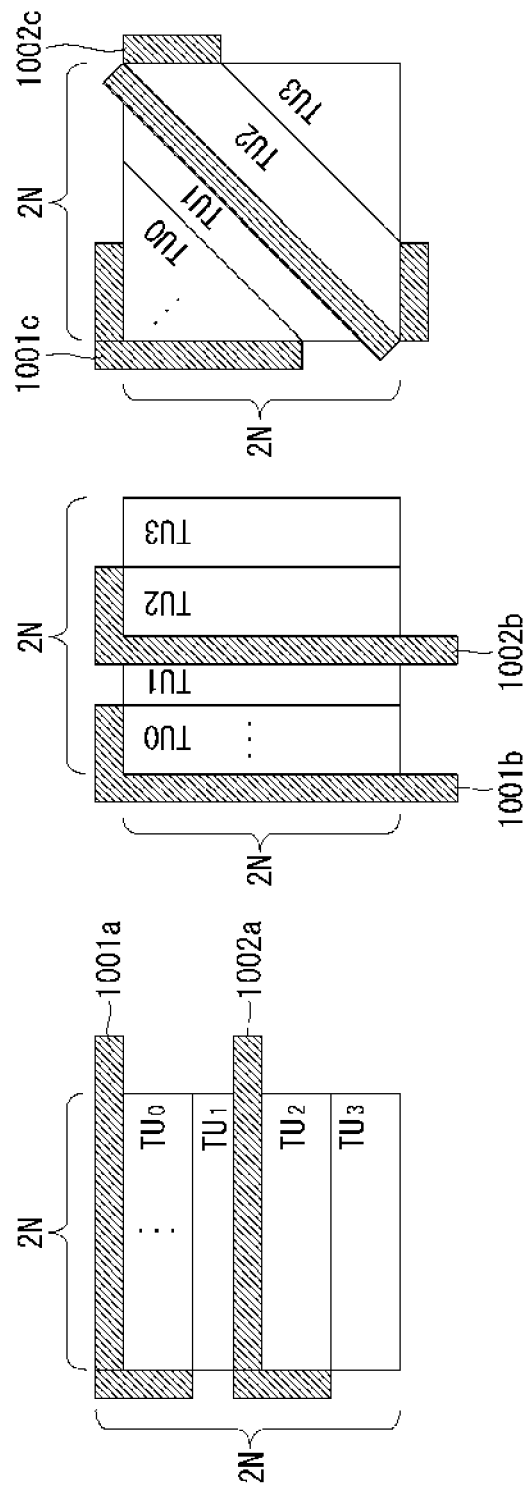

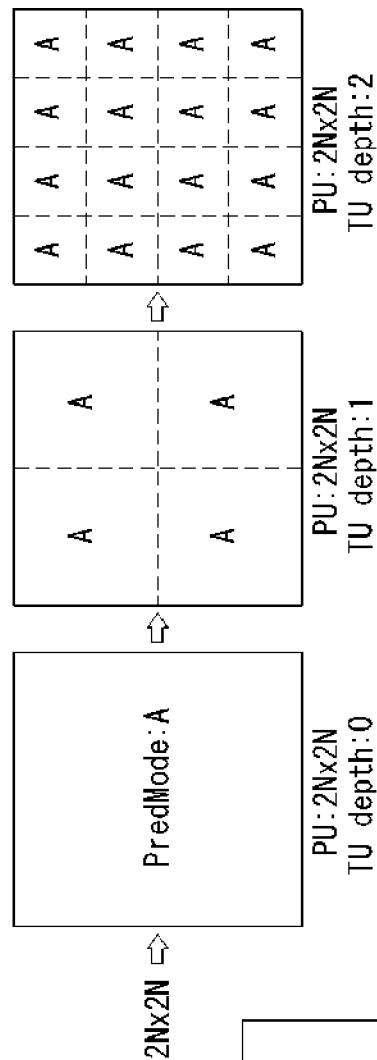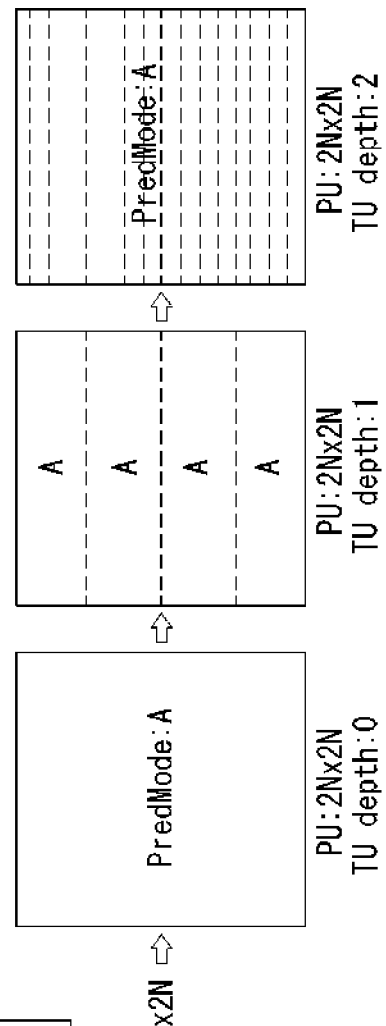

[Fig. 12]
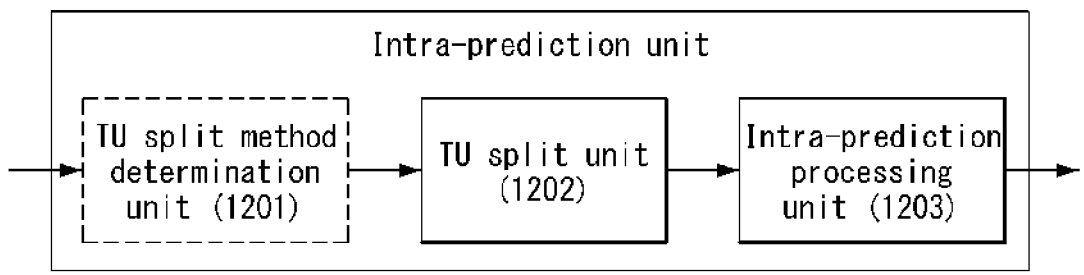

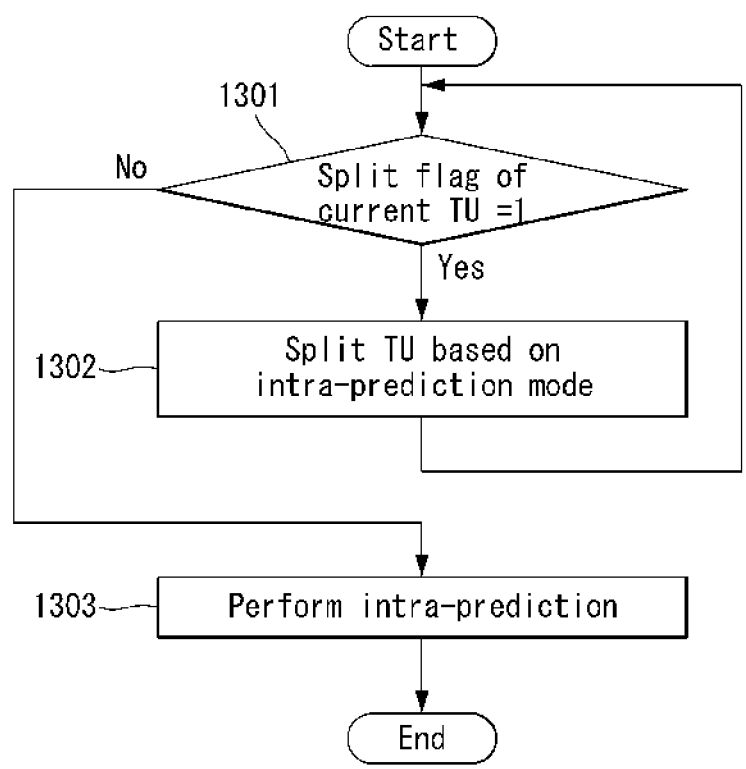
[Fig. 13]

[Fig. 14]
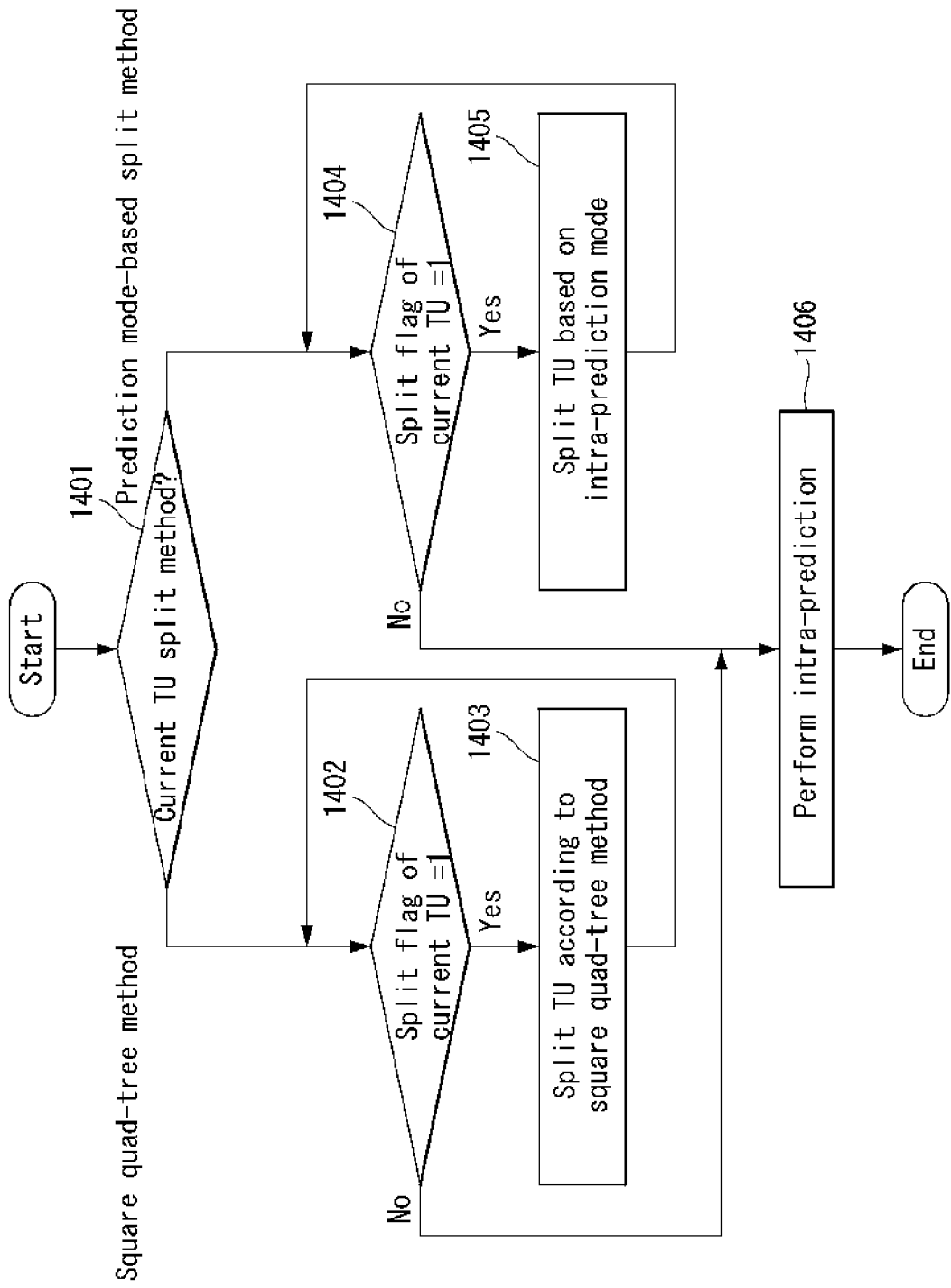

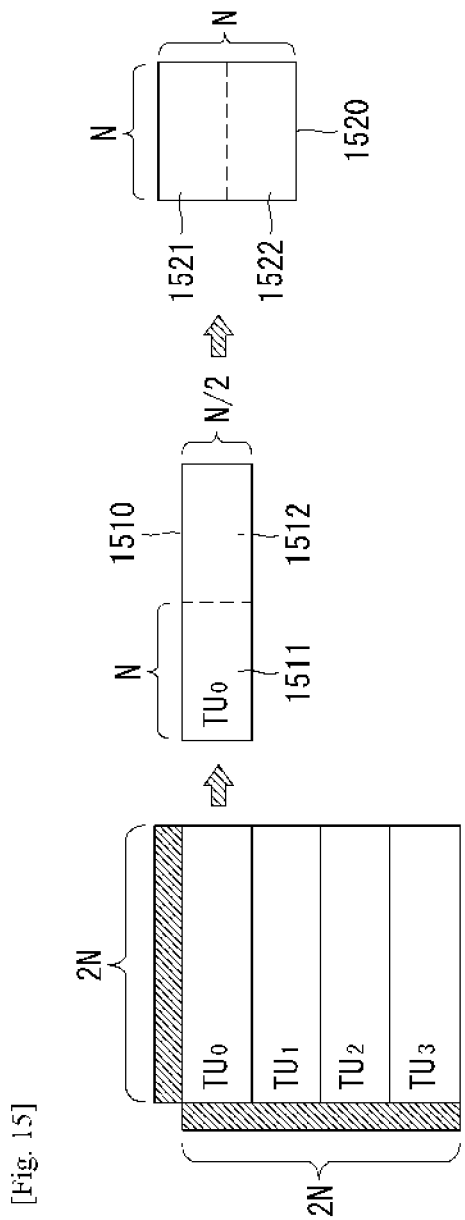
[Fig. 15]

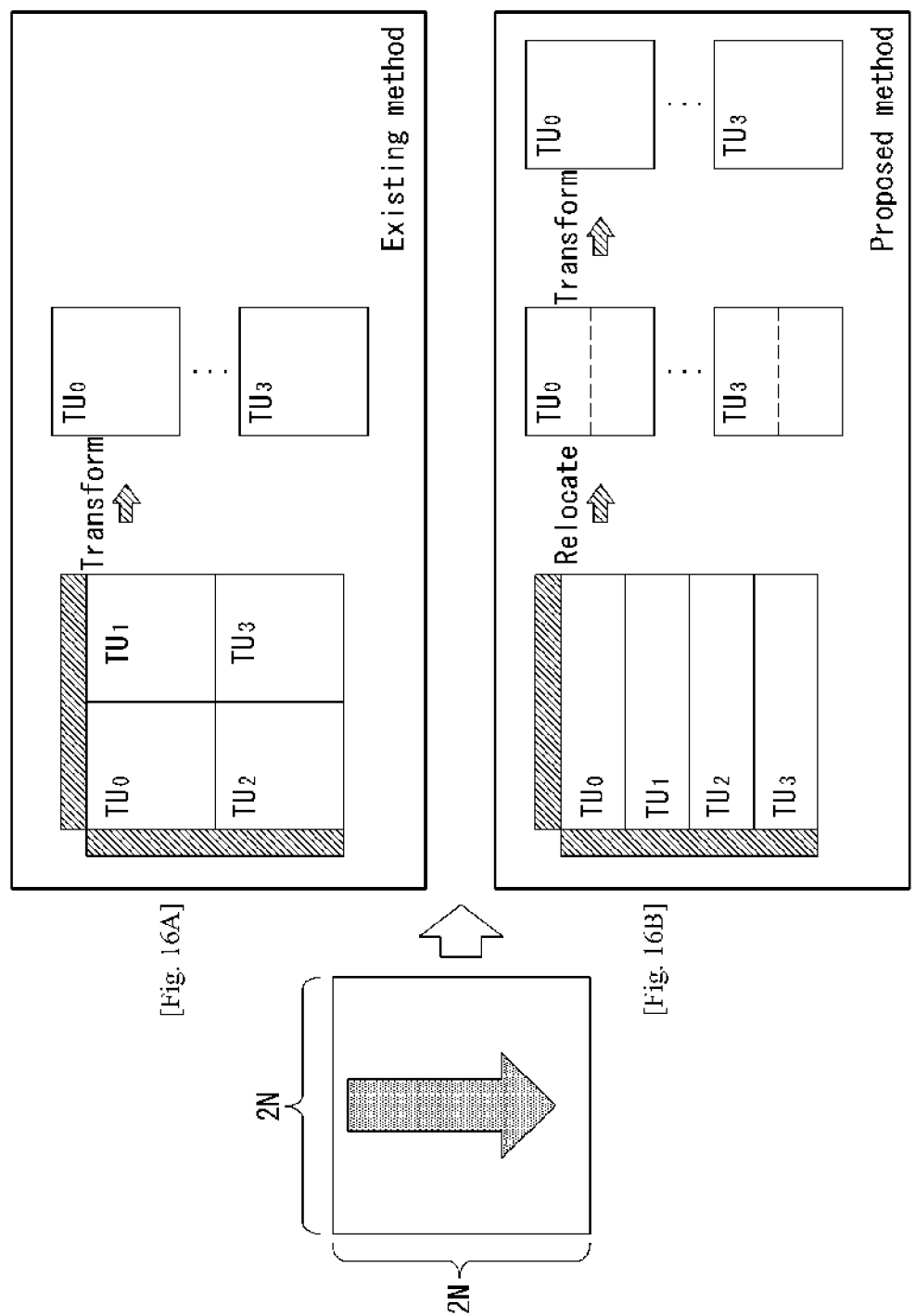

[Fig. 17]
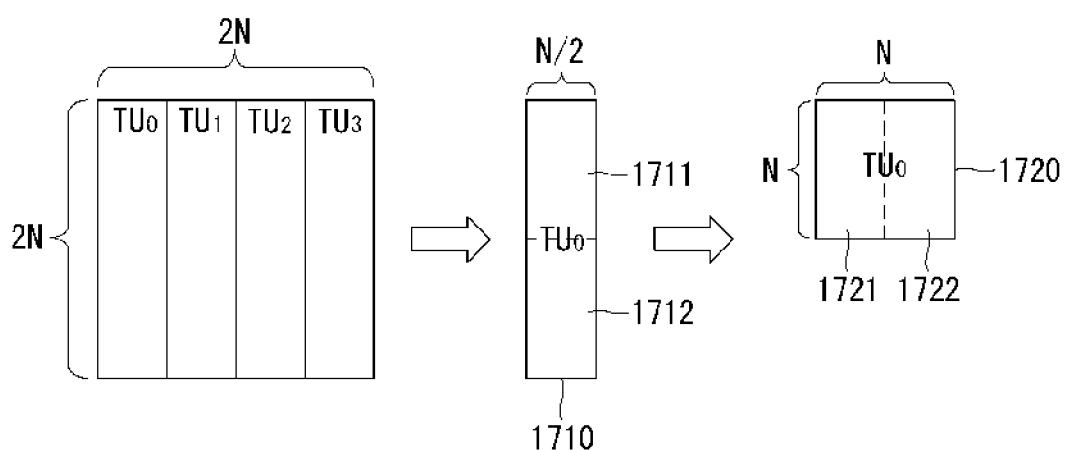

[Fig. 18]
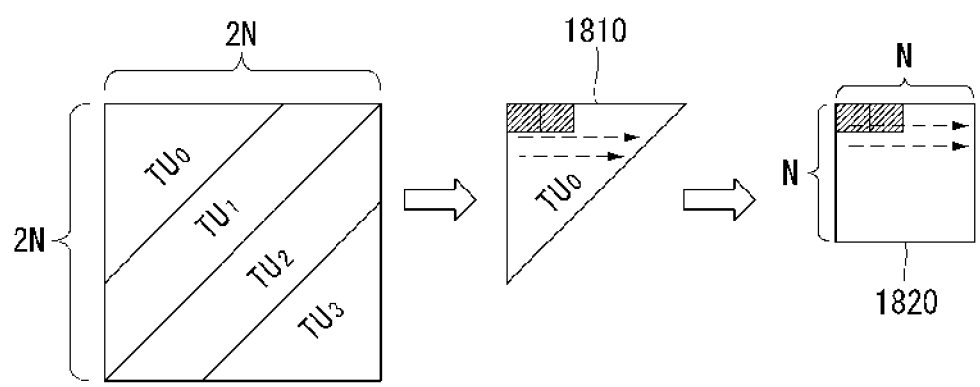

[Fig. 19]
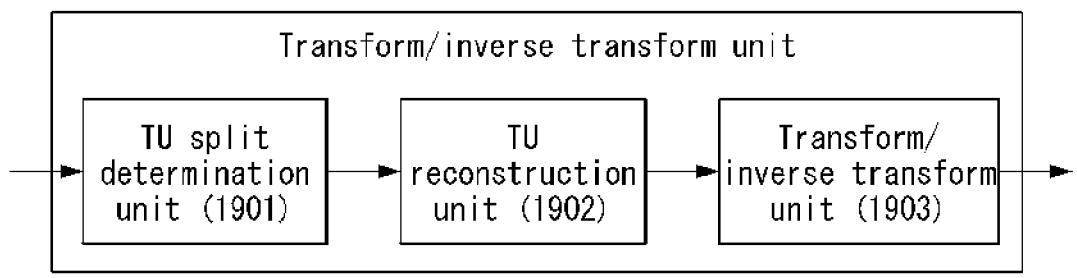

[Fig. 20]
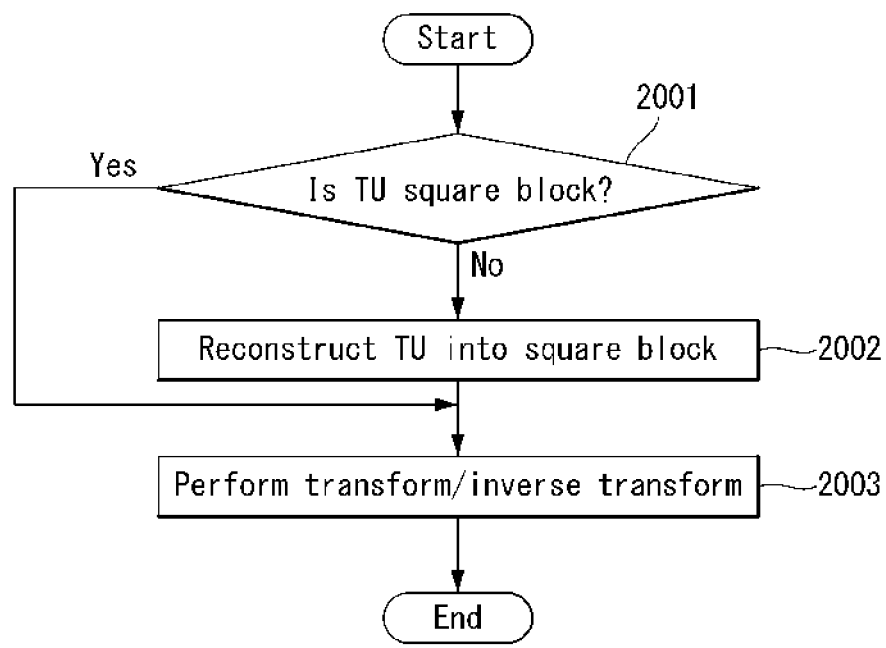

METHOD FOR PROCESSING IMAGE ON BASIS OF INTRA PREDICTION MODE AND APPARATUS THEREFOR

CROSS-REFERENCE TO RELATED APPLICATIONS

This application is a continuation of U.S. application Ser. No. 16/677,100, filed on Nov. 7, 2019, which is a continuation of U.S. application Ser. No. 15/560,651, filed on Sep. 22, 2017, now issued as U.S. Pat. No. 10,506,238, which is the National Stage filing under 35 U.S.C. 371 of International Application No. PCT/KR2015/013170, filed on Dec. 3, 2015, which claims the benefit of U.S. Provisional Application No. 62/137,163, filed on Mar. 23, 2015 the contents of which are all hereby incorporated by reference herein in their entirety.

TECHNICAL FIELD

The present invention relates to a method for processing a still image or moving image and, more particularly, to a method for encoding/decoding a still image or moving image based on an intra-prediction mode and an apparatus supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

In the existing compression technology of a still image or moving image, a method of compressing an image based on a block is used, but the characteristics of an image may not be properly reflected because the image is split and compressed in a fixed form of a square form in the image compression technology based on a block. In particular, when an intra-prediction mode is applied, there is a problem in that prediction accuracy is reduced as the distance from a reference sample becomes distant.

In order to solve such a problem, an object of the present invention is to propose a method of splitting an image based on the direction of an intra-prediction mode.

Furthermore, an object of the present invention is to propose a method of performing encoding/decoding on a split block based on the direction of an intra-prediction mode.

Furthermore, an object of the present invention is to propose a method of reconstructing a split block in a square block form based on the direction of an intra-prediction mode.

The objects of the present invention are not limited to the technical objects described above, and other technical that are objects not mentioned herein may be understood to those skilled in the art from the description below.

Technical Solution

In an aspect of the present invention, a method of processing an image based on an intra-prediction mode includes the steps of splitting a processing block based on an intra-prediction mode of the processing block and performing intra-prediction on the split processing block, wherein a split direction of the split processing block may be vertical to the prediction direction of the intra-prediction mode of the processing block.

In an aspect of the present invention, an apparatus for processing an image based on an intra-prediction mode includes a split unit splitting a processing block based on an intra-prediction mode of the processing block and an intra-prediction processing unit performing intra-prediction on the split processing block, wherein a split direction of the split processing block may be vertical to the prediction direction of the intra-prediction mode of the processing block.

Preferably, the processing block may be split when a split flag of the processing block is 1.

Preferably, whether the processing block is split according to a square quad-tree method or split vertically to the prediction direction may be determined based on the intra-prediction mode of the processing block.

Preferably, the processing block may be split according to the square quad-tree method if the intra-prediction mode of the processing block is intra-planar or intra-DC, otherwise, the processing block may be split vertically to the prediction direction.

Preferably, the method may further include the steps of reconstructing the split processing block into a square block and performing transform/inverse transform on the reconstructed processing block.

Preferably, if the split processing block is 2N×N/2, the split processing block may be split into two blocks each having a half horizontal size and the two blocks may be vertically relocated to reconstruct a square N×N block.

Preferably, if the split processing block is N/2×2N, the split processing block may be split into two blocks each having a half vertical size and the two blocks may be horizontally relocated to reconstruct a square N×N block.

Preferably, samples included in the split processing block may be relocated in predetermined order to reconstruct the square block.

Preferably, the method may further include the step of constructing a reference sample for the split processing block.

Preferably, if the split direction of the split processing block is horizontal or vertical, the reference sample may include a sample neighboring a left boundary of the split processing block, a sample neighboring a top boundary of the split processing block and a sample neighboring a top left of the split processing block.

Preferably, if the split direction of the processing block is 45°, the reference sample may include a sample neighboring a left boundary of the split processing block, a sample neighboring a top boundary of the split processing block, and a sample neighboring a top left of the split processing block.

Preferably, if the split direction of the processing block is 45°, the reference sample may include a sample neighboring a top left boundary of the split processing block, a sample neighboring a right boundary of the split processing block, a sample neighboring a bottom boundary of the split processing block.

Advantageous Effects

In accordance with an embodiment of the present invention, a still image or moving image is split based on the direction of an intra-prediction mode.

Accordingly, prediction accuracy can be improved because the distance between a reference sample and a prediction sample is reduced when intra-prediction is applied.

Furthermore, in accordance with an embodiment of the present invention, transform/inverse transform can be performed using a previously defined transform/inverse transform scheme by relocating (or reconstructing) a split block in a square block form based on the direction of an intra-prediction mode.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 is illustrates a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIGS. 3A-3B are diagrams for describing a split structure of a coding unit that may be applied to the present invention.

FIG. 4 is a diagram for describing a prediction unit that may be applied to the present invention.

FIG. 5 is an embodiment to which the present invention is applied and is a diagram illustrating an intra-prediction method.

FIG. 6 illustrates a prediction direction according to an intra-prediction mode.

FIGS. 7 and 8 are diagrams for illustrating a problem in existing intra-mode prediction.

FIGS. 9A-9C illustrate an intra-prediction mode-based spit method according to an embodiment of the present invention.

FIGS. 10A-10C illustrate a method of constructing a reference sample for a split block based on an intra-prediction mode according to an embodiment of the present invention.

FIGS. 11A-11B are diagrams for illustrating a comparison between an existing block split method and the block intra-prediction mode-based spit method according to the present invention.

FIG. 12 is a more detailed diagram illustrating an intra-prediction unit according to an embodiment of the present invention.

FIGS. 13 and 14 are diagrams illustrating a method of processing a video signal based on an intra-prediction mode according to an embodiment of the present invention.

FIG. 15 is a diagram for illustrating a method of relocating (or reconstructing) a transform unit according to an embodiment of the present invention.

FIGS. 16A-16B are diagrams for illustrating a comparison between an existing transform block split method and a transform block reconstruction method according to the present invention.

FIG. 17 is a diagram for illustrating a method of relocating (or reconstructing) a transform unit according to an embodiment of the present invention.

FIG. 18 is a diagram for illustrating a method of relocating (or reconstructing) a transform unit according to an embodiment of the present invention.

FIG. 19 is a more detailed diagram illustrating a transform unit/inverse transform unit according to an embodiment of the present invention.

FIG. 20 is a diagram illustrating a method of processing a video signal based on an intra-prediction mode according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in this specification, a "processing unit" means a unit in which an encoding/decoding processing process, such as prediction, transform and/or quantization, is performed. Hereinafter, for convenience of description, a processing unit may also be called a "processing block" or "block."

A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), coding block (CB), prediction block (PB) or transform block (TB) for a luma component. Alternatively, a processing unit may correspond to a coding tree block (CTB), coding block (CB), prediction block (PB) or transform block (TB) for a chroma component. Furthermore, the present invention is not limited thereto, and a processing unit may be construed as a meaning including a unit for a luma component and a unit for a chroma component.

Furthermore, a processing unit is not essentially limited to a square block and may be constructed in a polygon form having three or more vertices.

Furthermore, hereinafter, in this specification, a pixel, a picture element, etc. are collectively called a sample. Furthermore, to use a sample may mean to use a pixel value, a picture element value or the like.

FIG. 1 is illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

In particular, the transform unit 120 according to the present invention may perform transform by reconstructing a processing block in a square block if a current processing block is not a square block. The transform unit 120 is described in detail later.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequantization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy. In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Next, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

In particular, the intra-prediction unit 182 according to the present invention may split a current processing block based on a split direction determined based on an intra-prediction mode, and may perform intra-prediction on the split processing blocks. The intra-prediction unit 182 is described in detail later.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

In particular, the inverse transform unit 230 according to the present invention may perform inverse transform by reconstructing a current processing block in a square block if the current processing block is not a square block. The inverse transform unit 230 is described in detail later.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

In particular, the intra-prediction unit 262 according to the present invention may split a current processing block based on a split direction determined based on an intra-prediction mode, and may perform intra-prediction on the split processing block. The intra-prediction unit 262 is described in detail later. [83] In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(b), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(b), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and l have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

FIG. 5 is an embodiment to which the present invention is applied and is a diagram illustrating an intra-prediction method.

Referring to FIG. 5, the decoder derives an intra-prediction mode of a current processing block (S501).

An intra-prediction mode may have a prediction direction for the location of a reference sample used for prediction depending on a prediction mode. An intra-prediction mode having a prediction direction is called an intra-angular prediction mode (Intra_Angular prediction mode). In contrast, an intra-prediction mode not having a prediction direction includes an intra-planar (INTRA_PLANAR) prediction mode and an intra-DC (INTRA_DC) prediction mode.

Table 1 illustrates intra-prediction modes and associated names, and FIG. 6 illustrates a prediction direction according to an intra-prediction mode.

TABLE 1

| INTRA-PREDICTION MODE | ASSOCIATED NAMES |
|---|---|
| 0 | Intra-planar (INTRA_PLANAR) |
| 1 | Intra-DC (INTRA_DC) |
| 2 . . . , 34 | intra-angular 2 . . . , intra-angular 34 (INTRA_ANGULAR2 . . . , INTRA_ANGULAR34) |

In intra-prediction, prediction is performed on a current processing block based on a derived prediction mode. A reference sample used for prediction and a detailed prediction method are different depending on a prediction mode. If a current block is an intra-prediction mode, the decoder derives the prediction mode of a current block in order to perform prediction.

The decoder checks whether neighboring samples of the current processing block can be used for prediction and constructs reference samples to be used for the prediction (S502).

In intra-prediction, neighboring samples of the current processing block mean a sample neighboring the left boundary of current processing block of an nS×nS size, a total of 2×nS samples neighboring a bottom left of the current processing block, a sample neighboring the top boundary of the current processing block, a total of 2×nS samples neighboring the top right of the current processing block, and one sample neighboring the top left of the current processing block.

However, some of the neighboring samples of the current processing block have not yet been coded or may not be available. In this case, the decoder may construct reference samples to be used for prediction by substituting unavailable samples with available samples.

The decoder may perform filtering on the reference samples based on the intra-prediction mode (S503).

Whether or not to perform the filtering of the reference samples may be determined based on the size of the current processing block. Furthermore, the filtering method of the reference samples may be determined based on a filtering flag transferred by the encoder.

The decoder generates a prediction block for the current processing block based on the intra-prediction mode and the reference samples (S504). That is, the decoder generates a prediction block (i.e., generates a prediction sample) for the current processing block based on the intra-prediction mode derived in the step S501 of deriving an intra-prediction mode and the reference samples obtained through the reference sample construction step S502 and the reference sample filtering step S503.

If the current processing block has been encoded in the INTRA_DC mode, in order to minimize the discontinuity of a boundary between processing blocks, a sample at the left boundary of a prediction block (i.e., a sample within a prediction block neighboring the left boundary) and a sample at the top boundary of the prediction block (i.e., a sample within a prediction block neighboring the top boundary) may be filtered at step S504.

Furthermore, at step S504, with respect to the vertical mode and horizontal mode of intra-angular prediction modes, as in the INTRA_DC mode, filtering may be applied to the left boundary sample or the top boundary sample.

This is described in more detail. If a current processing block has been encoded in the vertical mode or horizontal mode, the value of a prediction sample may be derived based on a reference sample located in a prediction direction. In this case, a boundary sample that belongs to the left boundary sample and top boundary sample of a prediction block and that is not located in the prediction direction may neighbor a reference sample not used for prediction. That is, the distance from the reference sample not used for prediction may be much closer than the distance from a reference sample used for prediction.

Accordingly, the decoder may adaptively apply filtering to left boundary samples or top boundary samples depending on whether an intra-prediction direction is vertical or horizontal. That is, if the intra-prediction direction is vertical, the decoder may apply filtering to the left boundary samples. If the intra-prediction direction is horizontal, the decoder may apply filtering to the top boundary samples.

In encoding/decoding according to such an intra-prediction mode, there is a problem in that the accuracy of prediction is reduced as the distance from reference samples becomes distant. This is described with reference to the following figure.

FIG. 7 is a diagram for illustrating a problem in existing intra-mode prediction.

FIG. 7 illustrates a case where a TU of a 4×4 size has been encoded in a vertical intra-prediction mode. In FIG. 7, an arrow indicates a prediction direction.

Referring to FIG. 7, a prediction sample value is derived using a reference sample located in a vertical direction.

In this case, prediction samples 702 located in a top boundary within a TU have high prediction accuracy because they are close to reference samples 701, whereas prediction samples 703 located in a bottom boundary within the TU have low prediction accuracy because they are distant from the reference samples 701.

FIG. 8 is a diagram for illustrating a problem in existing intra-mode prediction.

FIG. 8 illustrates PUs (i.e., same as CUs) of an 2N×2N size and TUs (i.e., depth=1) of an N×N size.

In intra-prediction encoding of HEVC, as in FIG. 8, TU split is performed on a CU in a square form, and actual prediction and reconstruction are performed on each of the split square-shaped TUs. As shown in FIG. 8, if the size of a PU is 2N×2N and a TU depth is 1, a bottom-right sample 802 of each TU has low prediction accuracy corresponding to the distance N between a reference sample 801 and a prediction sample with respect to intra-prediction modes according to all of directions in addition to a vertical intra-prediction mode and a horizontal intra-prediction mode.

Accordingly, the present invention proposes a method of improving the accuracy of intra-prediction by minimizing the distance between a reference sample and a prediction sample in intra-prediction.

In particular, the present invention proposes a method of splitting a processing unit in various forms based on each intra-prediction mode and performing intra-prediction.

That is, there is proposed a method of splitting a processing unit based on an intra-prediction mode and performing intra-prediction. Preferably, the processing unit may be split in a form orthogonal to the prediction direction of each intra-prediction mode.

Hereinafter, in describing an embodiment of the present invention, it is assumed that a unit in which intra-prediction and transform are performed is a transform unit (TU) (or transform block (TB)), a transform unit is split from a coding unit (CU) (or coding block), and a unit in which an intra-prediction mode is determined is a prediction unit (PU) (or prediction block), for convenience of description, but this is only an example and the present invention is not limited thereto. That is, as described above, a transform unit/coding unit/prediction unit may be substituted with a processing unit (or processing block) having a specific size or form.

FIG. 9 illustrates an intra-prediction mode-based spit method according to an embodiment of the present invention.

FIG. 9 illustrates a PU (i.e., identical with a CU) of a 2N×2N size and a TU of a depth 1.

FIG. 9(a) illustrates a method of splitting a TU in a vertical intra-prediction mode, FIG. 9(b) illustrates a method of splitting a TU in a horizontal intra-prediction mode, and FIG. 9(c) illustrates a method of splitting a TU in a bottom-right (i.e., 135°) (e.g., INTRA_ANGULAR18 in the example of FIG. 6) intra-prediction mode.

In FIG. 9, an arrow indicates a prediction direction.

In FIG. 9, a coding order of TUs is performed in order of a TU_0, a TU_1, a TU_2 and a TU_3. After one TU is encoded and decoded, it is used as a reference sample for the encoding of a next TU.

As in FIG. 9(a), in the vertical intra-prediction mode, TUs may be split from a CU in a horizontal direction. As described above, by splitting the TUs and performing prediction in the direction vertical to the direction of an intra-prediction mode, the distance between a reference sample 901a and the furthermost bottom-right prediction sample 902an in a TU_0 can be reduced to N/2. Even in a TU_1, likewise, if the TU_0 is used as a reference pixel after it is encoded and decoded, the distance between the reference sample and a bottom-right prediction sample furthermost from the reference sample in the TU_1 can be reduced to N/2. Even in the TU_2 and TU_3, the distance between the reference sample and a prediction sample furthermost from the reference sample can be reduced to N/2 using the same method.

As in FIG. 9(b), in horizontal intra-prediction, TUs may be split from a CU in a vertical direction. As described above, by splitting the TUs in the direction vertical to the direction of an intra-prediction mode and performing prediction, the distance between the reference sample 901b and a bottom-right prediction sample 902b furthermost from the reference sample in a TU_0 can be reduced to N/2. Even in a TU_1, likewise, if a $TU_0$ is used as a reference pixel after it is encoded and decoded, the distance between the reference sample and a bottom-right prediction sample furthermost from the reference sample in the TU_1 can be reduced to N/2. Even in a TU_2 and TU_3, the distance between the reference sample and a prediction sample furthermost from the reference sample can be reduced to N/2 using the same method.

As in FIG. 9(c), in an intra-prediction mode of a 135° direction, TUs may be split from a CU in a 45° direction. As described above, by splitting the TUs in the direction vertical to the direction of an intra-prediction mode and performing prediction, the distance between a reference sample 901c and a bottom-right prediction sample 902c furthermost from the reference sample in a TU_0 can be reduced. Even in a TU_1, likewise, if the TU_0 is used as a reference pixel after it is encoded and decoded, the distance between a reference sample and a bottom-right prediction sample furthermost from the reference sample in the TU_1 can be reduced to N/2. Even in a TU_2 and TU_3, the distance between the reference sample and a prediction sample furthermost from the reference sample can be reduced to N/2 using the same method.

As in the examples of FIGS. 9(a) to 9(c), TUs are split from a CU in the direction orthogonal to the prediction direction of an intra-prediction mode, but may be split according to a quad-tree method as in a conventional technology. That is, one CU may be split into four TUs of a depth 1.

In FIG. 9, TUs of a depth 1 have been illustrated, for convenience of description, but the present invention is not limited thereto. That is, TUs may be split by applying the same method as that of FIG. 9 to a TU having a depth 2 or more. For example, as in the example of FIG. 9(a), in the vertical intra-prediction mode, a TU having a depth 2 may be split from each TU having a depth 1. As a result, all of the TUs of the depth 2 may have N/8 in the vertical direction. That is, a method of splitting a TU of a depth 1 from a CU may be identically applied to the spit method.

In accordance with an embodiment of the present invention, all of TUs of the same depth split from one CU may be split to have the same area. In other words, TUs of the same depth split from one CU may be split to include the same number of samples. For example, in the case of FIG. 9(c), all of the TU 0, TU 1, TU 2 and TU 3 may be split to have the same area or the same number of samples.

By splitting TUs by considering the direction of a prediction mode as described above, intra-prediction performance can be improved because the distance between a reference sample and a prediction sample can be reduced.

Furthermore, in FIG. 9, only intra-prediction direction of the vertical direction, horizontal direction and 135° direction has been illustrated, for convenience of description, but the present invention is not limited thereto. That is, TUs may be split in the direction vertical to an intra-prediction direction in various intra-prediction directions. For example, in the case of HEVC, a total of 35 prediction modes are used for intra-prediction. If the present invention is applied to the 33 prediction modes that belong to the 35 prediction modes and that have directivity, 33 TU split directions (e.g., vertical to the intra-prediction direction) may be determined depending on directions according to the 33 intra-prediction modes.

FIG. 10 illustrates a method of constructing a reference sample for a split block based on an intra-prediction mode according to an embodiment of the present invention.

FIG. 10 illustrates only reference samples for a TU 0 and a TU 2 for each intra-prediction mode, for convenience of description, but reference samples for a TU 1 and a TU 3 may be constructed using the same method.

FIG. 10(a) illustrates reference samples for TUs split in a horizontal direction according to a vertical intra-prediction mode. FIG. 10(b) illustrates reference sample for TUs split in a vertical direction according to a horizontal intra-prediction mode. FIG. 10(c) illustrates reference samples for TUs split in a 45° direction according to the intra-prediction mode of a 135° direction (e.g., INTRA_ANGULAR18 in the example of FIG. 6).

Referring to FIG. 10(a), reference samples 1001a and 1002a for a TU spit in a horizontal direction may include a sample neighboring the left boundary of the corresponding TU, a sample neighboring the top boundary of the corresponding TU and a sample neighboring the top left of the corresponding TU for each TU, that is, a TU 1, a TU 2, a TU 3 and a TU 4.

In this case, the number of reference samples may be determined based on the size of a TU and/or the split form of the TU.

For example, in the case of a TU of a 2N×N/2 size as in FIG. 10(a), a total number of the reference samples 1001a and 1002a of the TU may be different from those of a TU that is split according to an existing square quad-tree method and that has the same depth. That is, in the case of a TU of an N×N size split in a square quad-tree, the reference samples 1001a and 1002a have a total of 4N+1. In contrast, in the case of a TU of a 2N×N/2 size as in FIG. 10(a), reference samples may have a total of (3N)+(N/2)+1, that is, the number of samples neighboring the top boundary of the corresponding TU and the number of samples neighboring the top right of the corresponding TU is 3N, the number of samples neighboring the left boundary of the corresponding TU and the number of samples neighboring the bottom left of the corresponding TU is N/2, and the number of samples neighboring the top left of the corresponding TU is 1.

For another example, as in FIG. 10(a), in the case of a TU of a 2N×N/2 size, the reference samples 1001a and 1002a may have a total of (3N)+(N/2)+1, that is, the number of samples neighboring the left boundary of the corresponding TU and the number of samples neighboring the bottom left of the corresponding TU is N, the number of samples neighboring the top boundary of the corresponding TU is (2N)+(N/2), the number of samples neighboring the top right of the corresponding TU is (2N)+(N/2), and the number of samples neighboring the top left of the corresponding TU is 1.

Referring to FIG. 10(b), reference samples 1001b and 1002b for a TU split in a vertical direction may include a sample neighboring the left boundary of the corresponding TU, a sample neighboring the top boundary of the corresponding TU, and a sample neighboring the top left of the corresponding TU for each of TUs TU 1, TU 2, TU 3 and TU 4.

As described above, the number of reference samples may be determined based on the size of a TU and/or a split form of the TU.

For example, as in FIG. 10(b), in the case of a TU of an N/2×2N size, a total number of the reference samples 1001b and 1002b of the TU may be different from those of a TU that is split according to a square quad-tree method and that has the same depth. In the case of the TU of the N×N size split in the square quad-tree, the reference samples 1001b and 1002b has a total of 4N+1. In contrast, in the case of the TU of the N/2×2N size as in FIG. 10(b), reference samples may have a total of (3N)+(N/2)+1, that is, the number of samples neighboring the left boundary of the corresponding TU and the number of samples neighboring the bottom left of the corresponding TU are 3N, the number of samples neighboring the top boundary the corresponding TU and the number of samples neighboring the top right of the corresponding TU is N/2, and the number of samples neighboring the top left of the corresponding TU is 1.

For another example, in the case of the TU of the N/2×2N size as in FIG. 10(b), the reference samples 1001b and 1002b may have a total of (3N)+(N/2)+1, that is, the number of samples neighboring the left boundary of the corresponding TU and the number of samples neighboring the bottom left of the corresponding TU are (2N)+(N/2), the number of samples neighboring the top boundary of the corresponding TU and the number of samples neighboring the top right of the corresponding TU are N, and the number of samples neighboring the top left of the corresponding TU is 1.

Referring to FIG. 10(c), reference samples for a TU split in a 45° direction may include sample neighboring the boundary of the corresponding TU for each TU.

That is, in the case of a TU 0 and a TU 1, a reference sample 1001c may include a sample neighboring the left boundary of a corresponding TU, a sample neighboring the top boundary of the corresponding TU, and a sample neighboring the top left of the corresponding TU.

In contrast, in the case of a TU 2 and a TU 3, a reference sample 1002c may include a sample neighboring the top left boundary of the corresponding TU, a sample neighboring the right boundary of the corresponding TU and a sample neighboring the bottom boundary of the corresponding TU.

FIG. 10(c) illustrates only the TUs spit in the 45° direction, but reference samples may be constructed according to the same method as that of FIG. 10(c) in the case of a prediction direction other than a vertical direction and a horizontal direction.

As described above, the number of reference samples may be determined based on the size of a TU and/or a split form of the TU.

For example, in the case of the TU split as in FIG. 10(c), a total number of the reference samples 1001c and 1002c of the TU may be different from those of a TU that is split according to a square quad-tree method and that has the same depth. That is, the total number of reference samples 1001c and 1002c may be different from those of a TU of an N×N size split in a square quad-tree.

For another example, in the case of the TU split as in FIG. 10(c), the number of reference samples may include only samples neighboring the boundaries of the corresponding TU. Accordingly, the number of reference sample may be determined depending on the boundary (e.g., the length of the boundary) of a TU that reference samples neighbor.

FIG. 11 is a diagram for illustrating a comparison between an existing block split method and the block intra-prediction mode-based spit method according to the present invention.

FIG. 11 illustrates split forms of a TU according to a split depth of the TU if the size of a CU is 2N×2N and the size of a PU is 2N×2N like the CU.

FIG. 11(a) illustrates a case where a TU is split according to an existing square quad-tree manner, and FIG. 11(b) illustrates a case where a TU is split based on an intra-prediction mode according to the present invention.

As described above, in an intra-prediction mode, the intra-prediction mode is determined in a PU unit, and prediction and reconstruction may be performed in a TU unit. In this case, prediction and reconstruction are performed on TUs included in the PU according to the same intra-prediction mode.

Accordingly, as in FIG. 11, if the prediction mode (PredMode) of a PU is A, prediction and reconstruction are performed on all of TUs based on the same prediction mode (PredMode) A regardless of whether the TUs are split from a CU according to the existing square quad-tree method or whether the TUs are split in the direction vertical to an intra-prediction direction according to the present invention. In FIG. 11, the prediction mode (PredMode) A is assumed to be a horizontal intra-mode prediction mode.

In accordance with a TU split method according to the present invention, a split direction is determined depending on the direction of an intra-prediction mode, but the number of split TUs may be the same as that of an existing square quad-tree method. That is, in the case of a TU of a depth 1, one CU is split into four TUs. In the case of a TU of a depth 2, one CU is split into 16 TUs.

That is, even in the TU split method according to the present invention, a quad-tree method may be applied. Accordingly, whenever a depth is increased by 1, one CU (or TU) may be split into four TUs of a lower level.

FIG. 12 is a more detailed diagram illustrating the intra-prediction unit according to an embodiment of the present invention.

Referring to FIG. 12, the intra-prediction unit (refer to 182 of FIG. 1 and 262 of FIG. 2) implements the functions, processes and/or methods proposed in FIGS. 7 to 11. Specifically, the intra-prediction unit 182, 262 may be configured to include a TU split unit 1202 and an intra-prediction processing unit 1203.

Furthermore, the intra-prediction unit 182, 262 may be configured to further include a TU split method determination unit 1201.

The TU split method determination unit 1201 determines a spit method based on whether the spit method of a current TU (or TB) is an existing square quad-tree spit method or an intra-prediction mode.

In this case, a spit method of a current TU (or TB) may be determined based on an intra-prediction mode. For example, as in Table 1, if intra-prediction modes have been defined, a spit method of a TU (or TB) to which the intra-prediction mode (i.e., 0 and 1) not having directivity has been applied may be determined to be the square quad-tree spit method. A spit method of a TU (or TB) to which the intra-prediction modes (i.e., 2 to 34) having directivity has been applied may be determined to be a spit method based on an intra-prediction mode.

If a TU spit method has not been determined for each TU (or TB) (e.g., if only an intra-prediction mode-based spit method is applied to all of current pictures), the TU split method determination unit 1201 may not be included in the intra-prediction unit 182, 262.

The TU split unit 1202 may split a current TU (or TB) based on an intra-prediction mode. In this case, the TU split unit 1202 may split the current TU (or TB) according to the quad-tree method in the direction orthogonal to the prediction direction of the intra-prediction mode of the current TU (or TB) as in FIGS. 9 to 11.

In this case, the decoder may determine whether or not to split the current TU (or TB) using a split flag provided by the encoder.

Furthermore, the TU split unit 1202 may split the current TU (or TB) according to the existing square quad-tree spit method.

The intra-prediction processing unit 1203 performs intra-prediction on each of TUs (or TBs).

The intra-prediction processing unit 1203 may perform intra-prediction on a current TU (or TB) using the process according to the example of FIG. 5. In this case, reference samples may be configured according to the example of FIG. 10.

FIG. 13 is a diagram illustrating a method of processing a video signal based on an intra-prediction mode according to an embodiment of the present invention.

Referring to FIG. 13, the decoder (in particular, the intra-prediction unit) determines whether the split flag of a current TU (or TB) is 1 (S1301).

In this case, the current TU (or TB) may be specified because a location value (e.g., coordinate value) for specifying the current TU (or TB) is set as a location value of the top-left sample of the current TU (or TB).

In this case, the split flag may be provided as a syntax element by the encoder.

If the split flag is 1 at step S1301, the decoder splits the current TU (or TB) based on an intra-prediction mode (S1302).

That is, as in the examples of FIGS. 9 to 11, the decoder may split the current TU (or TB) in a form orthogonal to the prediction direction of the intra-prediction mode.

In this case, to split the current TU (or TB) may mean that the location value (e.g., coordinate value) for specifying the current TU (or TB) is set as a location value of a specific sample (e.g., a location value of the top-left sample) of a spit TU (or TB) based on the intra-prediction mode.

Accordingly, the spit TU (or TB) corresponds to the current TU (or TB), and step S1301 is performed. Furthermore, steps S1301 and S1302 are repeatedly performed until the split flag of the current TU (or TB) is not 1.

If the split flag is 0 at step S1301, the decoder performs intra-prediction on the current TU (or TB) based on the intra-prediction mode (S1303).

In this case, the decoder may perform intra-prediction on the current TU (or TB) using the process according to the example of FIG. 5. In this case, the reference sample may be constructed based on the example of FIG. 10.

Meanwhile, the encoder (in particular, the intra-prediction unit) may perform the same process except step S1301 of FIG. 13. That is, the encoder may split a current TU (or TB) based on an intra-prediction mode and perform intra-prediction.

FIG. 14 is a diagram illustrating a method of processing a video signal based on an intra-prediction mode according to an embodiment of the present invention.

Referring to FIG. 14, the decoder (in particular, the intra-prediction unit) determines a spit method of a current TU (or TB) (S1401).

In this case, the spit method of the current TU (or TB) may be determined based on an intra-prediction mode. For example, if intra-prediction modes have been defined as in Table 1, the spit method of a TU (or TB) to which the intra-prediction modes (i.e., 0 and 1) not having directivity have been applied may be determined to be a square quad-tree spit method, and the spit method of a TU (or TB) to which the intra-prediction modes (i.e., 2 to 34) having directivity have been applied may be determined to be an intra-prediction mode-based spit method.

In this case, the current TU (or TB) may be specified because a location value (e.g., coordinate value) for specifying the current TU (or TB) is set as a location value of the top-left sample of the current TU (or TB).

If the spit method of the current TU (or TB) is a square quad-tree spit method at step S1404, the decoder determines whether the split flag of the current TU (or TB) is 1 (S1402).

In this case, the split flag may be provided as a syntax element by the encoder.

If the split flag is 1 at step S1402, the decoder splits the current TU (or TB) according to a square quad-tree method (S1403).

That is, as in the example of FIG. 3, the decoder may split the current TU (or TB) according to the square quad-tree method.

In this case, to split the current TU (or TB) may mean that the location value (e.g., coordinate value) for specifying the current TU (or TB) is set as the location value of the top-left sample of a spit TU (or TB) according to the square quad-tree method.

Accordingly, the spit TU (or TB) corresponds to the current TU (or TB), and step S1402 is performed. Furthermore, steps S1402 and S1403 are repeated until the split flag of the current TU (or TB) is not 1.

In contrast, if the spit method of the current TU (or TB) is an intra-prediction mode-based spit method at step S1401, the decoder determines whether the split flag of the current TU (or TB) is 1 (S1404).

In this case, the split flag may be provided as a syntax element by the encoder.

If the split flag is 1 at step S1404, the decoder splits the current TU (or TB) based on an intra-prediction mode (S1302).

That is, as in the examples of FIGS. 9 to 11, the decoder may split the current TU (or TB) in a form orthogonal to the prediction direction of the intra-prediction mode.

In this case, to split the current TU (or TB) may mean that the location value (e.g., coordinate value) for specifying the current TU (or TB) is set as the location value of a specific sample of the spit TU (or TB) (e.g., the location value of the top-left sample) based on the intra-prediction mode.

Accordingly, the spit TU (or TB) corresponds to the current TU (or TB), and step S1404 is performed. Furthermore, steps S1404 and S1405 are repeated until the split flag of the current TU (or TB) is not 1.

Meanwhile, if the split flag is 0 at steps S1402 or S1404, the decoder performs intra-prediction on the current TU (or TB) based on an intra-prediction mode (S1406).

In this case, the decoder may perform intra-prediction on the current TU (or TB) using the process according to the example of FIG. 5.

In this case, if the current TU (or TB) has been split according to an intra-prediction mode-based spit method, a reference sample may be constructed based on the example of FIG. 10.

Meanwhile, the encoder (in particular, the intra-prediction unit) may perform the same process except steps S1402 and S1404 of FIG. 14. That is, a spit method of a current TU (or TB) may be determined, the current TU (or TB) may be split according to the spit method, and intra-prediction may be performed on the current TU (or TB).

FIG. 15 is a diagram for illustrating a method of relocating (or reconstructing) a transform unit according to an embodiment of the present invention.

FIG. 15 shows an example in which an intra-mode prediction direction is vertical and split from a CU of a 2N×2N size into four TUs having a depth 1 is performed in a horizontal direction.

If the split of TUs is performed based on an intra-prediction mode proposed by the present invention, it is difficult to apply transform provided in HEVC. That is, in HEVC, transform to a TU unit of a square form is performed. However, according to a TU split method according to the present invention, it is difficult to apply transform provided in HEVC because a TU split form is determined based on an intra-prediction direction.

Accordingly, TUs split in a form orthogonal to the intra-prediction direction are relocated (or reconstructed) so that the transform of HEVC can be applied to the spit TUs.

Referring to FIG. 15, a TU 0 1520 of an N×N size of a square form is constructed by splitting a TU 0 1510 having a 2N×N/2 size into two blocks 1511 and 1512 each having a half horizontal size and relocating (or reconstructing) them in a vertical direction.

In this case, the TUs may be relocated in predetermined scan order. For example, in accordance with raster scan order, since a decoding process is performed on the left TU 0 1511 earlier than the right TU 0 1512, the left TU 0 1511 may be disposed on the upper side 1521 and the right TU 0 1512 may be disposed on the lower side 1522 when the TUs are relocated for transform.

The decoder performs the same process on the remaining TU 1, TU 2 and TU 3 using the same method.

As described above, the decoder performs prediction and reconstruction in a spit TU unit based on each intra-prediction mode. Furthermore, for transform, the TUs are relocated in a square block according to predefined scan order, and transform is performed in a relocated TU unit.

FIG. 16 is a diagram for illustrating a comparison between an existing transform block split method and a transform block reconstruction method according to the present invention.

FIG. 16 illustrates a split form of TUs in which the size of a CU is 2N×2N and a split depth is 1.

FIG. 16(*a*) illustrates a case where TUs are split according to an existing square quad-tree method, and FIG. 16(*b*) illustrates a case where TUs are split based on intra-prediction direction according to the present invention. In particular, FIG. 16(*b*) illustrates a case where an intra-mode prediction direction is vertical and four TUs are split in a horizontal direction.

As in FIG. 16(*a*), if TUs are split according to the existing square quad-tree method, the decoder performs prediction and reconstruction on each TU of a square form in predefined scan order and also performs transform.

In contrast, as in FIG. 16(*b*), if TUs are split based on the intra-prediction mode, the decoder performs prediction and reconstruction in a spit TU unit in predefined scan order so that TUs are vertical to the prediction direction of the intra-prediction mode. Furthermore, the decoder relocates (or reconstructs) the spit TUs in TUs of a square form so that they are vertical to the prediction direction and then performs transform.

In FIGS. 15 and 16, a case where the prediction direction of the intra-prediction mode is vertical has been illustrated, but the above method may be identically applied to a case where the prediction direction is different.

FIG. 17 is a diagram for illustrating a method of relocating (or reconstructing) a TU according to an embodiment of the present invention.

FIG. 17 illustrates a case where an intra-mode prediction direction is horizontal and four TUs having a depth 1 are split from a CU of a 2N×2N size in a vertical direction.

As described above, it is difficult to apply transform provided in HEVC because a TU spit form is determined based on an intra-prediction direction. TUs are relocated (or reconstructed) so that transform of HEVC can be applied to a spit TU in a form orthogonal to the intra-prediction direction.

Referring to FIG. 17, a TU 0 1710 having an N/2×2N size is split into two blocks 1711 and 1712) each having a half vertical size. The two blocks 1711 and 1712 are relocated in a horizontal direction to construct a TU 0 1720 of an N×N size of a square form.

In this case, the TU may be relocated in predetermined scan order. For example, according to raster scan order, since a decoding process is performed on the top TU 0 1711 earlier than the bottom TU 0 1712, the top TU 0 1711 may be disposed in a left 1721 and the bottom TU 0 1712 may be disposed in a right 1722 when the TUs are relocated for transform.

The decoder performs the same process on the remaining TU 1, TU 2 and TU 3 using the same method.

As described above, the decoder performs prediction and reconstruction in a spit TU based on each intra-prediction mode. Furthermore, for transform, the decoder relocates a TU in a square block in predefined scan order and performs transform in a relocated TU unit.

FIG. 18 is a diagram for illustrating a method of relocating (or reconstructing) a TU according to an embodiment of the present invention.

FIG. 18(*a*) illustrates a case where an intra-mode prediction direction is a 135° direction (e.g., INTRA_ANGU-LAR18 in the example of FIG. 6) and four TUs having a depth 1 are split from a CU of a 2N×2N size in a 45° direction.

Referring to FIG. 18, the decoder constructs a TU 0 1820 of a square form by relocating (or reconstructing) samples, included in a spit TU 0 1810, based on an intra-prediction mode according to predetermined order.

In this case, a TU may be relocated (or reconstructed) in predetermined scan order. For example, according to raster scan order, samples included in the spit TU 0 1810 may be sequentially disposed in the TU 0 1820 of a square form from a top-left sample to a bottom-right sample based on an intra-prediction mode.

Meanwhile, although a prediction direction is vertical or horizontal, as in the example of FIG. 18, a TU of a square form may be constructed by relocating (or reconstructing) samples included in a corresponding TU in a square form.

FIG. 19 is a more detailed diagram illustrating the transform unit/inverse transform unit according to an embodiment of the present invention.

FIG. 19 illustrates the transform unit/inverse transform unit (refer to 120/150 of FIG. 1 and refer to 230 of FIG. 2) in one block form, for convenience of description. However, if the transform unit/inverse transform unit (refer to 120 of FIG. 1 and refer to 230 of FIG. 2) are included in the encoder, the transform unit corresponds to inverse transform, and the transform/inverse transform unit 1093 corresponds to the transform processing unit or the inverse transform processing unit. Likewise, if the transform unit/inverse transform unit 120/230 is included in the decoder, they correspond to the inverse transform unit, and the transform/inverse transform unit 1093 corresponds to the inverse transform processing unit.

Referring to FIG. 19, the transform unit/inverse transform unit 120/230 implements the functions, processes and/or methods proposed in FIGS. 15 to 18. Specifically, the transform unit/inverse transform unit 120/230 may be configured to include a TU split determination unit 1901, a TU reconstruction unit 1902 and a transform/inverse transform unit 1903.

The TU split determination unit 1901 determines whether a current TU (or TB) has been split in a square form. That is, the TU split determination unit 1901 determines whether the current TU (or TB) has been split according to an existing square quad-tree method or split according to a spit method based on an intra-prediction mode.

In this case, the TU split determination unit 1901 may determine a spit method based on an intra-prediction mode of the current TU (or TB). For example, as in Table 1, if intra-prediction modes have been defined, the spit method of a TU (or TB) to which the intra-prediction modes (i.e., 0 and 1) not having directivity have been applied may be determined to be a square quad-tree spit method, and the spit method of a TU (or TB) to which the intra-prediction modes (i.e., 2 to 34) having directivity have been applied may be determined to be an intra-prediction mode-based spit method.

The TU reconstruction unit 1902 reconstructs (or relocates) the current TU (or TB) in a square block. In this case, the TU reconstruction unit 1902 may reconstruct (or relocate) the current TU (or TB) in a square block using the method of reconstructing (or relocating) a TU (or TB) according to FIGS. 15 to 18.

The transform/inverse transform unit 1903 performs transform/inverse transform processing on the current TU (or TB). In this case, the transform/inverse transform unit 1903 may transform/inverse transform the current TU (or TB) using the method described in FIGS. 1 and 2.

FIG. 20 is a diagram illustrating a method of processing a video signal based on an intra-prediction mode according to an embodiment of the present invention.

In FIG. 20, transform/inverse transform steps have been illustrated as being one step, for convenience of description, but the encoder may perform transform or inverse transform and the decoder may perform inverse transform.

Referring to FIG. 20, the decoder/encoder (in particular, the intra-prediction unit) determines whether a current TU (or TB) is a square block (S2001).

In this case, the decoder/encoder may determine a spit method based on an intra-prediction mode of the current TU (or TB). For example, as in Table 1, if intra-prediction modes have been defined, the spit method of a TU (or TB) to which the intra-prediction modes (i.e., 0 and 1) not having directivity have been applied may be determined to be a square quad-tree spit method, and the spit method of a TU (or TB) to which the intra-prediction modes (i.e., 2 to 34) having directivity have been applied may be determined to be an intra-prediction mode-based spit method.

If the current TU (or TB) is not a square block at step S2001, the decoder/encoder reconstructs (or relocates) the current TU (or TB) in a square block form (S2002).

In this case, the decoder/encoder (in particular, the intra-prediction unit) may reconstruct (or relocate) the current TU (or TB) in a square block form using the method of reconstructing (or relocating) a TU (or TB) according to FIGS. 15 to 18.

In contrast, if the current TU (or TB) is a square block at step S2001 or after the current TU (or TB) is reconstructed (or relocated) in a square block form at step S2002, the decoder/encoder performs transform/inverse transform on the current TU (or TB) (S2003).

The decoder/encoder may transform/inverse transform on the current TU (or TB) using the method described in FIGS. 1 and 2.

In the aforementioned embodiments, the elements and characteristics of the present invention have been combined in specific forms. Each of the elements or characteristics may be considered to be optional unless explicitly described otherwise. Each of the elements or characteristics may be implemented in a form not combined with another element or characteristic. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

As described above, the preferred embodiments of the present invention have been disclosed for illustrative purposes, and those skilled in the art may improve, change, substitute, or add various other embodiments without departing from the technological spirit and scope of the present invention disclosed in the attached claims.

The invention claimed is:

1. A method of decoding an image based on an intra-prediction mode by a decoder, comprising steps of:
obtaining a split flag of a processing block;
splitting the processing block into a plurality of transform units based on the split flag;
constructing a reference sample for each of the transform units;
performing intra-prediction and reconstruction on each of the transform units using the constructed reference sample based on an intra prediction mode of the processing block,
wherein a split direction of the processing block is horizontal or vertical,
wherein the reference sample comprises a sample neighboring a left boundary of each of the transform unit, a sample neighboring a top boundary of each of the transform unit and a sample neighboring a top left of each of the transform unit, and
wherein performing intra-prediction on each of the transform units further comprising step of:
obtaining a filtering flag of the reference sample based on the intra prediction mode; and
performing filtering on the constructed reference sample based on the filtering flag of the reference sample.

2. The method of claim 1, wherein whether the processing block is split according to a square quad-tree method or split vertically to the prediction direction is determined based on the intra-prediction mode of the processing block.

3. The method of claim 2, wherein:
the processing block is split according to the square quad-tree method if the intra-prediction mode of the processing block is intra-planar or intra-DC,
otherwise, the processing block is split vertically to the prediction direction.

4. The method of claim 1, further comprising steps of:
reconstructing the transform unit into a square block; and
performing transform/inverse transform on the reconstructed processing block.

5. A method of encoding an image based on an intra-prediction mode by an encoder, comprising steps of:
- splitting a processing block into a plurality of transform units;
- generating a split flag of the processing block;
- constructing a reference sample for each of the transform units; and
- performing intra-prediction using the constructed reference sample based on the intra-prediction mode of the processing block,
- wherein a split direction of the processing block is horizontal or vertical, and
- wherein the reference sample comprises a sample neighboring a left boundary of each of the transform unit, a sample neighboring a top boundary of each of the transform unit and a sample neighboring a top left of each of the transform unit, and
- wherein performing intra-prediction on each of the transform units further comprising step of:
- performing filtering on the constructed reference sample; and
- generating a filtering flag of the reference sample based on the intra prediction mode.

6. The method of claim 5, wherein whether the processing block is split according to a square quad-tree method or split vertically to the prediction direction is determined based on the intra-prediction mode of the processing block.

7. The method of claim 5, wherein if the split direction of the processing block is 45°, the reference sample comprises a sample neighboring a left boundary of the transform unit, a sample neighboring a top boundary of the transform unit, and a sample neighboring a top left of the transform unit.

8. A non-transitory decoder-readable medium for storing a bitstream generated by a video encoding, the bitstream comprising:
- information used for determining whether a processing block is split into a plurality of transform units,
- information used for constructing a reference sample for each of the transform units,
- wherein when the processing block is split, a split direction of the processing block is horizontal or vertical, and
- wherein the reference sample comprises a sample neighboring a left boundary of each of the transform unit, a sample neighboring a top boundary of each of the transform unit and a sample neighboring a top left of each of the transform unit,
- information used for determining whether to perform filtering on the constructed reference sample based on the intra prediction mode, and
- information used for performing filtering on the constructed reference sample.

9. The method of claim 8, wherein when the processing block is split, whether the processing block is split according to a square quad-tree method or split vertically to the prediction direction is determined based on an intra-prediction mode of the processing block.

10. The method of claim 8, wherein when the processing block is split and the split direction of the processing block is 45°, the reference sample comprises a sample neighboring a left boundary of the transform unit, a sample neighboring a top boundary of the transform unit, and a sample neighboring a top left of the transform unit.

* * * * *